United States Patent Office 2,712,005
Patented June 28, 1955

2,712,005

DIAZOAMINO COMPOUND

Julian Jacob Leavitt, Somerville, N. J., assignor to American Cyanamid Company, New York, N. Y., a corporation of Maine No Drawing. Application June 16, 1953,
Serial No. 362,158

2 Claims. (Cl. 260—140)

This invention relates to azoic colors which may be employed in alkaline printing pastes or solutions and more particularly to a new diazoamino compound which may be represented by the formula

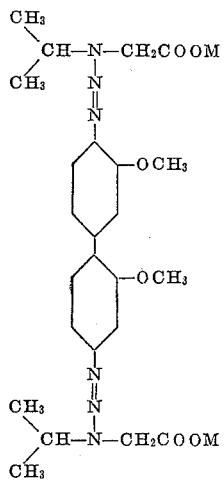

in which M is an alkali metal.

It has been a practice for many years in the art of dyeing and printing to incorporate a diazo compound and a coupling agent therefor, in a single alkaline solution or printing paste. It has been necessary to stabilize the diazo compound against azoic coupling in such a composition. This stabilization has been effected by reacting the diazo compound with various other compounds of basic nature to form a compound which would not react with conventional coupling agents. The compositions described made possible an advantageous coloring process which consisted of dyeing or printing with an alkaline bath or paste containing the coupling agent and stabilized diazo compounds and subsequently fixing or developing the color on the fiber by treating with weak acids. The acids reacted with the stabilized diazo compound to liberate the free diazo compound which coupled immediately on the fiber.

Diazo compounds have been stabilized most commonly for this purpose by reacting with a suitable amine, preferably a secondary amine, to form a diazoamino compound. The amines used normally contained solubilizing substituents such as sulfonic or carboxylic groups. Many diazoamino compounds were prepared and employed in the art, among which were those formed by reacting a diazo compound with N-alkyl glycines, N-alkylene glycines, and secondary amines of the formula HN—$R_1R_2$ wherein $R_1$ and $R_2$ stand for the same or different radicals selected from the group comprising alkyl, benzyl, phenyl and cyclohexyl and wherein $R_1$ and $R_2$ may have solubilizing substituents such as sulfonic or carboxylic groups.

It was desirable that diazoamino compounds to be used in the coloring compositions mentioned should be easily and economically formed and isolated and further that they should not have too great a tendency to enter into undesirable side reactions, should easily regenerate the diazo compound in an acid medium, and should have suitable solubility and stability under alkaline conditions. Suitable solubility of the diazoamino compound has been a difficult requirement to meet.

Diazoamino compounds are prepared from solutions of highly soluble diazonium salts; therefore, in order to obtain a good yield it is necessary to prepare compounds whose solubility is such that the product may be readily crystallized and isolated. The resulting diazoamino compound must however be soluble enough to give suitable concentrations in printing pastes and solutions. The problem, then, has been to discover a diazoamino compound which is insoluble enough to be prepared in economic yields and yet is soluble enough to be used in printing pastes or other compositions for dyeing.

In the past few years commercial users who formulate their own printing pastes have sought concentrated solutions of diazoamino compounds. Such solutions are easier to handle and to measure accurately than the dry, crystalline diazoamino compound. This new commerical demand has intensified the search for a solution to the perplexing problem of economically producing a diazoamino compound of high solubility.

The problem of supplying commercial users with concentrated diazoamino solutions is further complicated by the fact that most diazoamino compounds are not stable in solution on long storage, having a tendency to separate from concentrated solutions, particularly at low temperatures. Therefore, it has been impractical to ship or store concentrated diazoamino solutions in the winter or for long periods of time under any conditions. It has been possible to prepare reasonably satisfactory concentrated solutions of some diazoamino compounds in the presence of naphthols but only certain colors have been available. Blue azoic colors such as the derivatives of tetrazotized dianisidine were not available in concentrated solution for many years in spite of the great demand for them.

A great advance in the art was made when it was discovered that stabilized diazo compounds suitable for making concentrated solutions could be formed by using allyl glycine rather than the commonly used methyl glycine as a stabilizing amine. The allyl glycine stabilized compounds were more soluble than the known methyl glycine stabilized compounds and made possible the marketing of a wide variety of very satisfactory concentrated solutions of stabilized diazo compounds and naphthols. It was thought that the increased solubility was due to the unsaturation of the allyl group. Strangely enough, while the use of allyl glycine as a stabilizing amine produced satisfactory compounds with most azoic colors the result with tetrazotized dianisidine was not so happy. It was found in the preparation of allyl glycine-stabilized tetrazotized dianisidine that delay in isolation of the product caused a substantial decrease in yield due to decomposition. Thus, the use of allyl glycine to stabilize tetrazotized dianisidine gave a more soluble diazoamino compound, but the increased solubility was obtained at the expense of stability of the aqueous solution before isolation. It is not known why this one compound should exhibit loss of stability when all other allyl glycine stabilized diazo compounds are so satisfactory. Therefore, there was still a need for a stabilizing agent for tetrazotized dianisidine which would produce a diazoamino compound having the stability of the corresponding methyl glycine stabilized tetrazo in dilute aqueous solution and the solubility of the allyl glycine stabilized compound in the concentrated solutions of commerce.

A novel compound, isopropyl glycine stabilized tetrazotized dianisidine has now been discovered.

This new compound obviates the problems of the prior art and makes possible preparation of the much sought after concentrated solution of a stabilized diazo compound for forming blue azoic colors. This discovery, in addition to filling a long felt want, is surprising to the skilled dye chemist because the solubility and stability of the new compound are completely unexpected in view of the teaching of the prior art. The new compound is not only stable and easily isolated from aqueous solution but has greatly improved solubility over the methyl- or ethyl-glycine products under conditions commonly employed for the preparation of concentrated solutions of azoic colors consisting of a naphthol and a stabilized diazo compound. There is no known explanation for the increased solubility of the novel compound, which solubility is not only greater than that of the corresponding methyl glycine stabilized compound but actually approaches that of the improved allyl glycine stabilized compound. It is well known that increased chain length decreases solubility. One would expect from this teaching that the new compound would be less soluble than the methyl glycine stabilized tetrazo because of an increase of two carbon atoms in chain length. This is not the case. The new compound approaches the solubility of the allyl glycine derivative while retaining the stability of the methyl glycine type. The new compound in addition to its favorable solubility and excellent stability is also easily and inexpensively produced since the intermediate, isopropyl glycine, is cheap and readily available.

The new compound is easily salted out of solution by alkali-forming metal salts and yet the disodium salt can be dissolved in high concentration even in solutions containing coupling agents. My new compound need not be isolated immediately as was the case with allyl glycine stabilized tetrazo since its decomposition is negligible compared with that of prior art compounds. Another important advantage is that dilute aqueous solutions of isopropyl glycine-stabilized tetrazotized dianisidine after long storage with periodic assays show comparatively little loss of available real tetrazo compound.

The invention is described in detail in the examples below which illustrate preferred methods of preparing the novel compound and its salts. Various modifications of the procedures given will readily occur to those skilled in the art. Parts are by weight unless otherwise specified.

*Example 1*

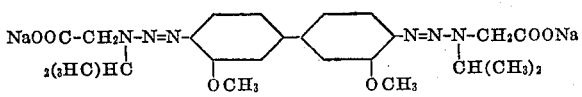

A solution of the tetrazonium chloride prepared from sixty-one parts of dianisidine is gradually added at a temperature of 18° C. to a solution of 318 parts soda ash and 61 parts of N-isopropyl glycine in 1,000 parts of water. The resulting dark brown solution, from which the tetrazo test quickly disappears, is clarified by filtration using 5 parts of siliceous filter aid. The filtrate, which has a volume of about 4,000 parts, is stirred and salted with 300 parts of sodium chloride. Stirring is continued until crystallization is complete, and the bis-diazoamino compound separates in the form of its disodium salt in excellent yield. The product is a greenish-yellow solid which is filtered, washed with alkaline brine, and dried.

*Example 2*

Other salts of the bis-diazoamino compounds may be prepared by substituting salts of other alkali metals for the soda ash of Example 1. The carbonates of alkali metals are generally used for this purpose but salts other than the carbonates are operative. It is, however, desirable to use a salt which is basic in character since the product is more stable in basic than in acidic solution.

The novel compound of this invention is valuable as a chemical intermediate in addition to its use in dye chemistry as will be apparent to the skilled chemist.

I claim:
1. A compound of the formula

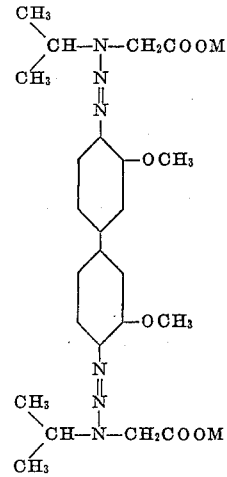

in which M is an alkali metal.
2. A compound of the formula

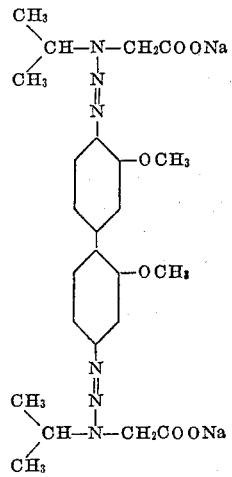

References Cited in the file of this patent
UNITED STATES PATENTS

| | | |
|---|---|---|
| 1,882,562 | Glietenberg et al. | Oct. 11, 1932 |
| 2,168,800 | Kracker et al. | Aug. 8, 1939 |
| 2,453,430 | Greig | Nov. 9, 1948 |